 US009934496B1

(12) United States Patent
Hanscom et al.

(10) Patent No.: US 9,934,496 B1
(45) Date of Patent: Apr. 3, 2018

(54) DATA MASKING USING A PROXY SERVER

(75) Inventors: Kenneth W. Hanscom, Thousand Oaks, CA (US); Michael P. Owen, Mountain View, CA (US)

(73) Assignee: INTUIT INC., Mountain View, CA (US)

( * ) Notice: Subject to any disclaimer, the term of this patent is extended or adjusted under 35 U.S.C. 154(b) by 1656 days.

(21) Appl. No.: 12/421,046

(22) Filed: Apr. 9, 2009

(51) Int. Cl.
*G06Q 20/00* (2012.01)
*G06Q 20/10* (2012.01)

(52) U.S. Cl.
CPC .................................. *G06Q 20/108* (2013.01)

(58) Field of Classification Search
CPC .................................................. G06Q 2220/16
USPC ....................................................... 705/50–79
See application file for complete search history.

(56) References Cited

U.S. PATENT DOCUMENTS

| 5,883,810 | A * | 3/1999 | Franklin et al. | 700/232 |
| 7,748,027 | B2 * | 6/2010 | Patrick | G06F 21/62 709/224 |
| 2003/0028481 | A1 * | 2/2003 | Flitcroft | G06Q 20/00 705/39 |
| 2005/0050324 | A1 * | 3/2005 | Corbett et al. | 713/168 |
| 2007/0222810 | A1 * | 9/2007 | Okuda | 347/19 |
| 2007/0276765 | A1 * | 11/2007 | Hazel et al. | 705/71 |
| 2009/0048997 | A1 * | 2/2009 | Manickam | G06F 21/62 706/47 |
| 2009/0049512 | A1 * | 2/2009 | Manickam | H04L 63/0407 726/1 |
| 2010/0024037 | A1 * | 1/2010 | Grzymala-Busse | G06F 21/6245 726/26 |
| 2011/0202987 | A1 * | 8/2011 | Bauer-Hermann | H04L 63/0815 726/7 |

* cited by examiner

*Primary Examiner* — Chinedu C Agwumezie
(74) *Attorney, Agent, or Firm* — Patterson + Sheridan, LLP (57) ABSTRACT

Embodiments of a proxy device, a system that includes the proxy device, a process, and a computer-program product (i.e., software) for use with the proxy device are described. This proxy device may be used to restrict access to account information during communication between a financial institution and a software engineer, such as a third-party software developer. In particular, the proxy device, which is an intermediary between the financial institution and the software engineer, may replace actual account information with dummy or encoded account information during communication from the financial institution to the software engineer. Similarly, the proxy device may replace the dummy or encoded account information with the actual account information during communication from the software engineer to the financial institution. In this way, the proxy device may facilitate software development while maintaining security of the actual account information.

14 Claims, 6 Drawing Sheets

DATA MASKING USING A PROXY SERVER

CROSS REFERENCE TO RELATED APPLICATIONS

This application is related to: pending U.S. patent application Ser. No. 12/421,039, entitled "Securing Credential Information Using a Proxy Server," by Kenneth W. Hanscom and Michael P. Owen, filed on 9 Apr. 2009; pending U.S. patent application Ser. No. 12/421,069, entitled "Restricting Document Access Based on User Profiles," by Kenneth W. Hanscom and Michael P. Owen, filed on 9 Apr. 2009; and U.S. patent application Ser. No. 11/831,173, entitled "Technique for Restricting Access to Information," by Rodney A. Robinson, Joann Ferguson, Thomas J. Holodnik, Thomas E. Dockman, Spencer W. Fong, and Michael P. Owen, filed on 31 Jul. 2007 and the contents of all of which are herein incorporated by reference.

BACKGROUND

The present disclosure relates to techniques for restricting access to account information during communication between a computer system and a remote location.

Organizations often outsource non-core business activities. This helps reduce expenses and to maintain the focus on core business activities. However, it is often difficult to outsource activities that involve sensitive customer information, such as financial information or health-care information. This is because it is very hard for the organization that is outsourcing the activities to ensure that a third party has implemented appropriate safeguards to protect such sensitive customer information. Consequently, an organization is typically reluctant to outsource such activities because, in the wrong hands, the sensitive customer information may result in identity theft or violations of governmental regulations that protect privacy (such as the Health Insurance Portability and Accountability Act). Moreover, such violations may result in financial liability for the organization.

SUMMARY

One embodiment of this disclosure relates to a system that communicates account information. This system includes a first interface that receives first account information for an account in a first data stream from a financial institution (where the first account information includes information other than credential information for the account), and a second interface that transmits second account information associated with the first account information in a modified first data stream to a software engineer. Moreover, the system includes a proxy device, which is coupled to the first interface and the second interface circuit, that modifies the first data stream by replacing the first account information with the second account information, thereby facilitating financial software development while maintaining security of the first account information.

Note that the financial institution may be at a location external to the system. For example, the location of the financial institution may be different than a location of the system.

Similarly, the software engineer may be at a location external to the system. For example, the location of the software engineer may be different than the location of the system. Furthermore, the software engineer may be associated with an organization that is different than the financial institution.

In some embodiments, the first account information includes actual account information, and the second account information includes either dummy information or an encoded version of the actual account information. This account information, which can be the first account information or the second account information, may include: an account number, financial values associated with a financial transaction and/or an account balance. Note that this encoding may be session dependent.

Moreover, the first data stream may include a document, and the modifying of the first data stream may preserve a structure of the document. For example, the document may include one or more web pages and the structure may include Hypertext Markup Language. In some embodiments, the modifying of the first data stream is selectively enabled based at least in part on predefined profiles of software engineers.

In some embodiments, the second interface also receives the second account information in a second data stream from the software engineer, and the first interface also transmits the first account information in a modified second data stream to the financial institution. In these embodiments, the proxy device modifies the second data stream by replacing the second account information with the first account information.

Another embodiment provides a method for performing at least some of the above-described operations. During operation, the proxy device receives the first account information for the account in the first data stream from the financial institution, where the first account information includes information other than credential information for the account. Then, the proxy device modifies the first data stream by replacing the first account information with second account information associated with the first account information. Next, the proxy device transmits the second account information in the modified first data stream to the software engineer, thereby facilitating financial software development while maintaining security of the first account information.

Another embodiment provides a computer-program product for use in conjunction with the system and/or the proxy device. This computer-program product may include instructions corresponding to at least some of the above-described operations.

Another embodiment provides the proxy device.

BRIEF DESCRIPTION OF THE FIGURES

Note that like reference numerals refer to corresponding parts throughout the drawings.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of a proxy device, a system that includes the proxy device, a process, and a computer-program product (i.e., software) for use with the proxy device are described. This proxy device may be used to restrict access to account information during communication between a financial institution and a software engineer, such as a third-party software developer. In particular, the proxy device, which is an intermediary between the financial institution and the software engineer, may replace actual account information with dummy or encoded account information during communication from the financial institution to the software engineer. Similarly, the proxy device may replace the dummy or encoded account information with the actual account information during communication from the software engineer to the financial institution. In this way, the proxy device may facilitate software development while maintaining security of the actual account information.

By selectively restricting access to the actual account information, the proxy device may allow an organization, such as the financial institution, to outsource to activities or tasks to third parties (i.e., to different organizations). In particular, the proxy device may allow these third parties to perform software development and/or testing, without accessing or modifying sensitive or protected information, such as the actual account information. Therefore, the proxy device may provide the benefits of outsourcing to the organization while reducing or eliminating potential security risks and the associated financial liability.

Figure 1:
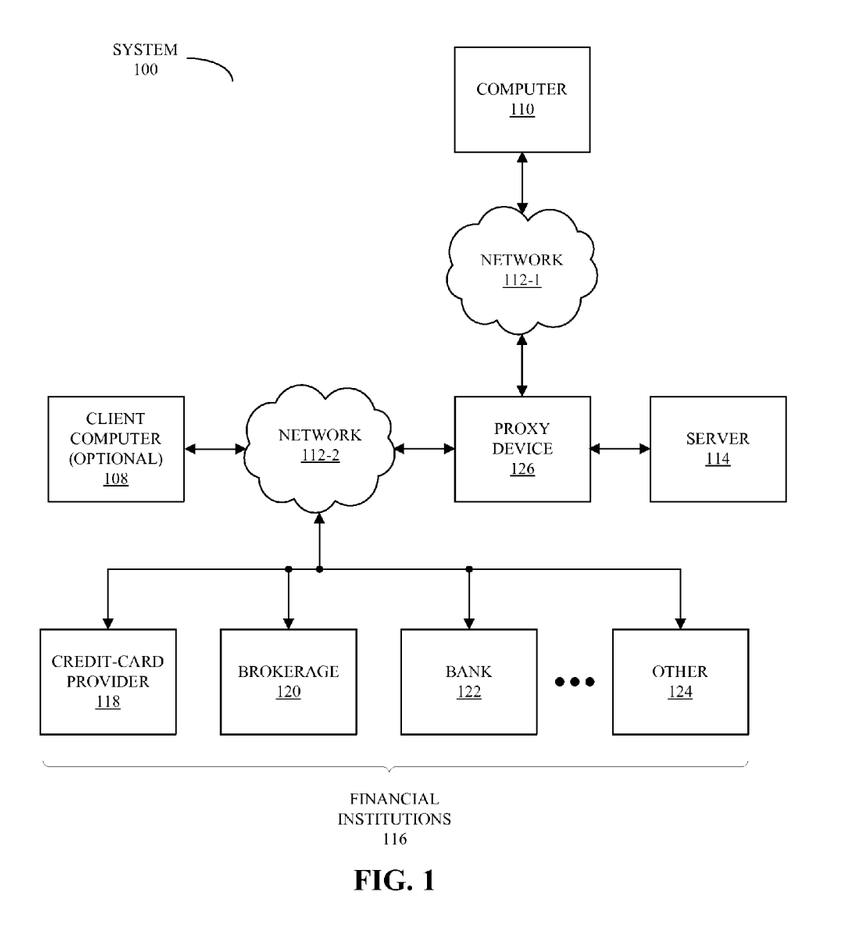
FIG. 1 is a block diagram illustrating a system including computers and servers that are networked together in accordance with an embodiment of the present disclosure.

We now describe embodiments of the system and the proxy device. FIG. 1 is a block diagram illustrating a system 100, which includes networked computers and servers. In this system, a provider of financial software may collect or aggregate information associated with a client or customer of at least one of financial institutions 116, such as: credit-card provider 118, brokerage 120, bank 122, and/or another institution 124 (e.g., a governmental agency, a payroll organization and/or an accountant). This aggregated information may be used for a wide variety of purposes, such as: completing a loan application, preparing an income tax return, and/or for accounting purposes.

In particular, a given customer may provide account information, as well as associated credential information, to the provider of the financial software (for example, the account information and the credential information may be provided to financial software). Note that the account information may include account numbers for one or more accounts at one or more of the financial institutions 116, and the credential information may include: the customer's name, the customer's Social Security number, one or more usernames and/or one or more passwords.

Using this information and aggregation software, the provider may automatically aggregate the information without further action by the customer. For example, aggregation software that executes in system 100, such as on server 114 and/or on an optional client computer 108, may use network 112-2 to access financial records at one or more of the financial institutions 116, and may aggregate the customer information. Note that the aggregation software may be a stand-alone application and/or may be embedded in another application. Therefore, in some embodiments the aggregation software is included or embedded in the financial software.

Furthermore, in some embodiments the aggregation software uses one or more aggregation scripts while aggregating information from a given financial institution. These aggregation scripts may be developed in advance of the aggregation based at least in part on knowledge about the given financial institution, such as the context and/or format(s) of data (for example, how data is arranged and where the relevant data is located). As described further below, a software engineer (such as a scripting engineer) may create the given aggregation script using a stand-alone scripting program that executes on computer 110 or a scripting module that is embedded in another application. In addition, because the aggregation scripts may not always work as intended (for example, there may be a bug or defect in a given aggregation script, and/or the information at the given financial institution may change when a web page is updated), the software engineer may maintain and/or test existing aggregation scripts.

In order to create, modify and/or test a given aggregation script, the software engineer often needs current knowledge or information about a given web page or website (which may include multiple web pages), such as the aforementioned context and/or format(s) of the data. Typically, the software engineer obtains this information by accessing live web pages associated with the financial institutions 116.

However, this type of access poses risks for a provider of the financial software. In particular, if the software engineer also has access to sensitive customer information, this sensitive information may be lost and/or misused. Note that this sensitive information may include: the credential information, the account information (including the account number, as well as financial values associated with one or more financial transactions and/or an account balance), and/or sensitive portions of one or more documents (such as one or more web pages or one or more websites). For example, using sensitive information, the software engineer may change a name associated with an account, may transfer funds, and/or may add new services, all without customer authorization. In addition to the potential damage to the relationship with the customer, such abuses may result in financial liability for the provider of the financial software. Consequently, the risks may outweigh the advantages associated with outsourcing the scripting-engineering function, thereby preventing the provider of the financial software from reducing expenses and/or focusing activities on core strengths.

In order to address this problem, and to allow the software engineer to be a third-party software developer (i.e., at a different organization than financial institutions 116 and/or the provider of the financial software), communication between computer 110 and financial institutions 116 may be mediated by an intermediary device, such as a proxy device 126, which may be in server 114 or between server 114 and network 112-2.

Figure 2:
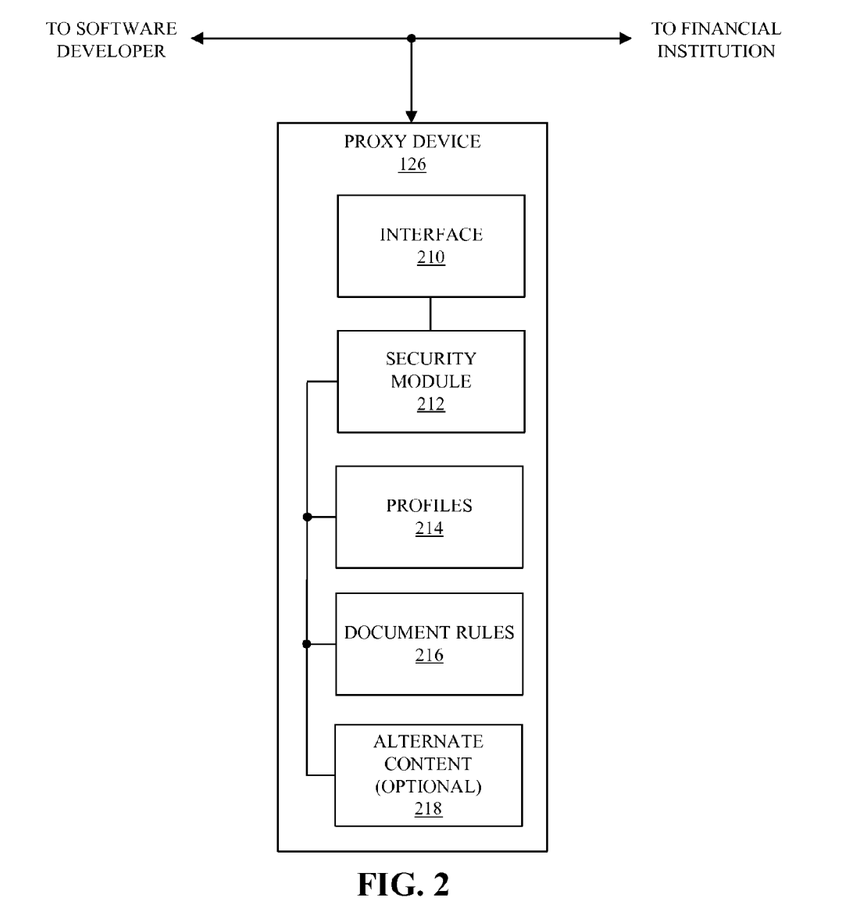
FIG. 2 is a block diagram illustrating a proxy device for use in the system of FIG. 1 in accordance with an embodiment of the present disclosure.

FIG. 2 presents a block diagram illustrating a proxy device 126. This proxy device includes an interface 210 that receives information in a data stream from a given financial institution that is intended for a given software engineer. (Thus, in some embodiments all communications between the given financial institution and the given software engineer are processed by proxy device 126.) Then, a security module 212 may selectively modify this information, for example, by removing and replacing sensitive content in the data stream. This removed sensitive content may include the actual credential information (such as a username and/or a password for an account) and/or the actual account information (such as an account number, financial values associated with one or more transactions, and/or an account balance). In its place, security module 212 may insert optional alternate content 218, such as dummy credential information and/or dummy account information. Alternatively or additionally, security module 212 may insert encoded versions (such as encrypted versions) of the actual credential information and/or the actual account information. For example, a unique code may be used to map each digit in the actual account number to a corresponding digit(s) in an encoded account number (which may have the same total number of digits as the actual account number or a different number of digits). This code may be time sensitive. For example, the code may expire after a time interval (such as 10 minutes) and/or may be changed during each new session when the given software engineer first attempts to access a website of the given financial institution.

More generally, security module 212 may restrict access by the given software engineer to information in one or more documents (such as one or more web pages) maintained by the given financial institution. Consequently, security module 212 may remove instructions for one or more web pages and/or websites that are included in the data stream. In some embodiments, the restrictions are within a document, such as to a portion of a given web page. In this case, security module 212 may remove or replace specific form elements in the given web page, such as one or more data strings and/or one or more data types, for example, by filtering or masking the given web page.

These modifications to the information in one or more documents may preserve a structure of the one or more documents. For example, if the one or more documents are web pages and/or websites, the modifications may preserve an overall Hypertext-Markup-Language (HTML) structure and/or eXtensible-Markup-Language (XML) structure of the one or more documents.

After modifying the information in the data stream, interface 210 may transmit the modified data stream to the given software engineer. Because the resulting one or more documents are still in an accurate format, the given software engineer can create, modify and/or test one or more aggregation scripts. For example, when rendered by a browser or scraped by an aggregation script executing on computer 110 (FIG. 1), a given web page will include the necessary information in the correct format corresponding to what was provided by the given financial institution. However, the sensitive information has been removed or replaced, thereby ensuring that the customer account information is secure.

Alternatively or additionally, when the given software engineer transmits another data stream to the given financial institution (which includes information associated with the one or more documents), proxy device 126 may reverse at least some of the modifications. For example, interface 210 may receive the information in the other data stream. Then, security module 212 may replace dummy or encoded credential information with actual credential information and/or may replace dummy or encoded account information with actual account information. More generally, security module 212 may modify the information to include previously removed instructions for one or more web pages and/or websites. Similarly, security module 212 may remove restrictions or substitutions for specific form elements in the given web page, thereby restoring the sensitive content originally provided by the given financial institution. Therefore, when proxy device 126 subsequently transmits the modified other data stream to the given financial institution, the information included in this modified other data stream will be correct. In this way, the given financial institution will be unaware that there have been any substitutions or restrictions in the one or more documents provided to the given software engineer.

As noted previously, the modifications to the information in a given data stream may be performed selectively by security module 212. In particular, security module 212 may only restrict or replace a portion of the information in the one or more documents in the given data stream for some software engineers. In this way, managers or individuals with a suitable level of access may be allowed to view the actual content provided by the given financial institution (i.e., for these individuals, proxy device 126 may remove or replace less information that it does for other individuals). This selective restriction may be based at least in part on one or more profiles 214. These profiles may be, at least in part, predefined by software engineers and other individuals at the third-party software developer, for example, by logging into server 114 (FIG. 1) and setting up their profiles using an administrator module during a registration process. In addition, the profiles 214 may be predefined or managed by an administrator at the provider of the financial software, who may define different levels of access or privileges for the software engineers and managers at one or more third-party software developers.

Furthermore, in some embodiments, the selective restricting of content in the one or more documents may be based at least in part on document rules 216. These document rules may be predefined by the administrator of the proxy device 126 for documents at the given financial institution. For example, document rules 216 may specify one or more web pages in a group of documents that the given software engineer (or software engineers having the same level of access) is allowed to view and another one or more web pages in the group of documents that the given software engineer is not allowed to view. When the given software engineer requests a group of documents, proxy device 126 may restrict the subset of the group of documents that the given software engineer is not allowed to view. Instructions for these web pages may be removed by proxy device 126 before the modified data stream is transmitted to the given software engineer.

Additionally, for each software engineer, document rules 216 may include: Uniform Resource Locators (URLs) or Hypertext-Transfer-Protocol (HTTP) headers for the allowed web pages and the not-allowed web pages; specific strings in one or more web pages that are not allowed; and/or one or more data types (or data formats) in one or more web pages that are not allowed. These latter two examples are illustrations of form elements that security module 212 may restrict or replace (for example, using optional alternate content 218) in at least a portion of one of the documents in the group of documents (such as one of the web pages).

Using form elements (or more generally, one or more HTML forms), security module 212 may inspect documents for particular data patterns (including patterns in text, graphics and/or images) that are subsequently modified or restricted. In this way, the proxy device 126 can inspect documents that include data in a variety of formats, such as: Ostensible Markup Language, XML and/or Adobe Acrobat. More generally, security module 212 may inspect documents using intelligent HTML parsing, in which a context of the data is used to identify content that is subsequently modified or restricted. Alternatively or additionally, matching techniques may be used, in which a given document is compared to an expression, which includes logical permutations of key words, synonyms, and/or paraphrases.

To facilitate the creation and maintenance of profiles 214 and/or document rules 216, as well as assessing the overall security in system 100 (FIG. 1), in some embodiments proxy device 126 generates an audit trail (such as a log) of documents received by proxy device 126 and any modifications made to these documents. In addition, proxy device 126 may log any attempts to circumvent the suppression or modification of information in the documents.

In this way, proxy device 126 may allow the script engineer to access the minimum features/web pages in a website maintained by one of the financial institutions 116 (FIG. 1). This access may facilitate the creation and/or maintenance of aggregation scripts without the previously described risks. Consequently, use of the proxy device 126 and the related security techniques may facilitate outsourcing of activities, such as the script engineering function.

In some embodiments the computer system 100 (FIG. 1) and/or the proxy device 126 include fewer or additional components. Moreover, two or more components may be combined into a single component and/or a position of one or more components may be changed. Note that computer 110 (FIG. 1), server 114 (FIG. 1), and financial institutions 116 (FIG. 1) may each be a different location, and may each be associated with a different organization.

Figure 3A:
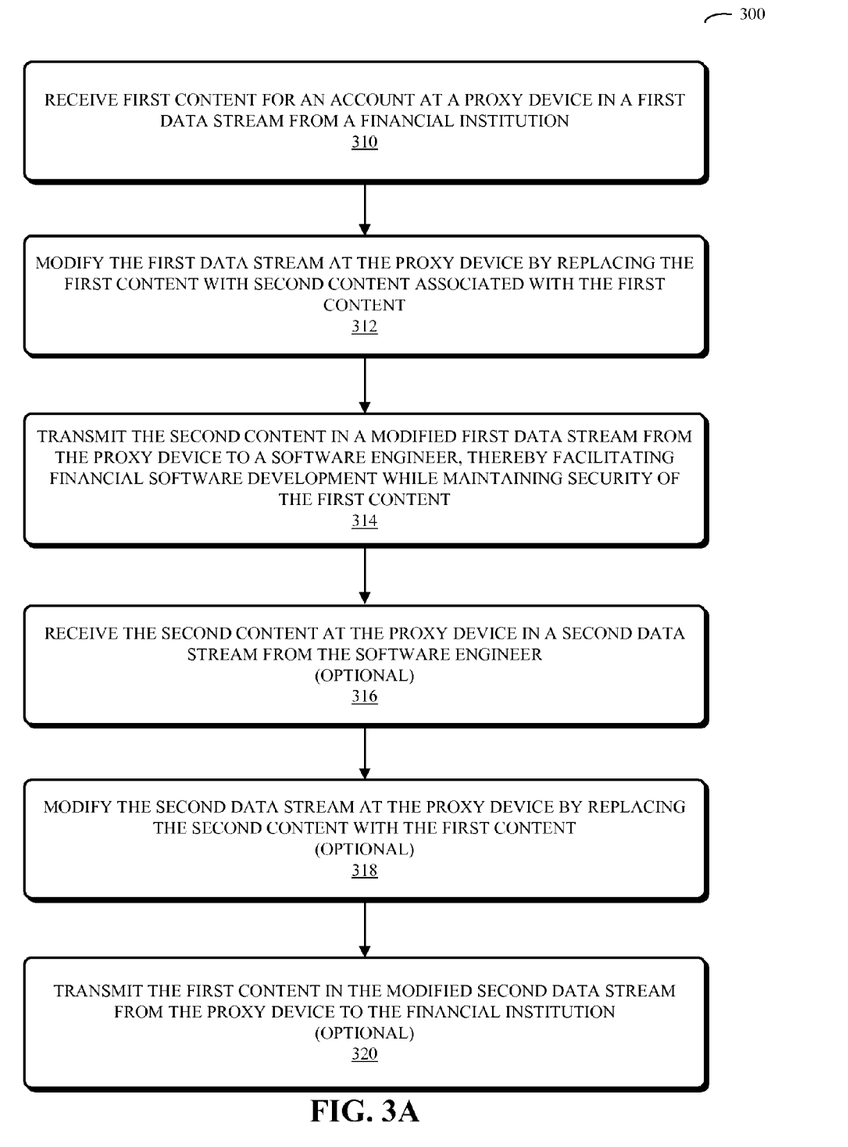
FIG. 3A is a flow chart illustrating a method for communicating content in accordance with an embodiment of the present disclosure.

We now discuss methods for communicating content or information. FIG. 3A presents a flow chart illustrating a method 300 for communicating content, which may be performed by a proxy device (such as proxy device 126 in FIG. 1). During operation, the proxy device receives first content (such as credential information or account information) for an account in a first data stream from a financial institution (310). Then, the proxy device modifies the first data stream by replacing the first content with second content associated with the first content (312). Next, the proxy device transmits the second content in a modified first data stream to a software engineer (314), thereby facilitating financial software development while maintaining security of the first content.

In some embodiments, the proxy device optionally receives the second content in a second data stream from the software engineer (316), and optionally modifies the second data stream by replacing the second content with the first content (318). Then, the proxy device optionally transmits the first content in a modified second data stream to the financial institution (320).

Figure 3B:
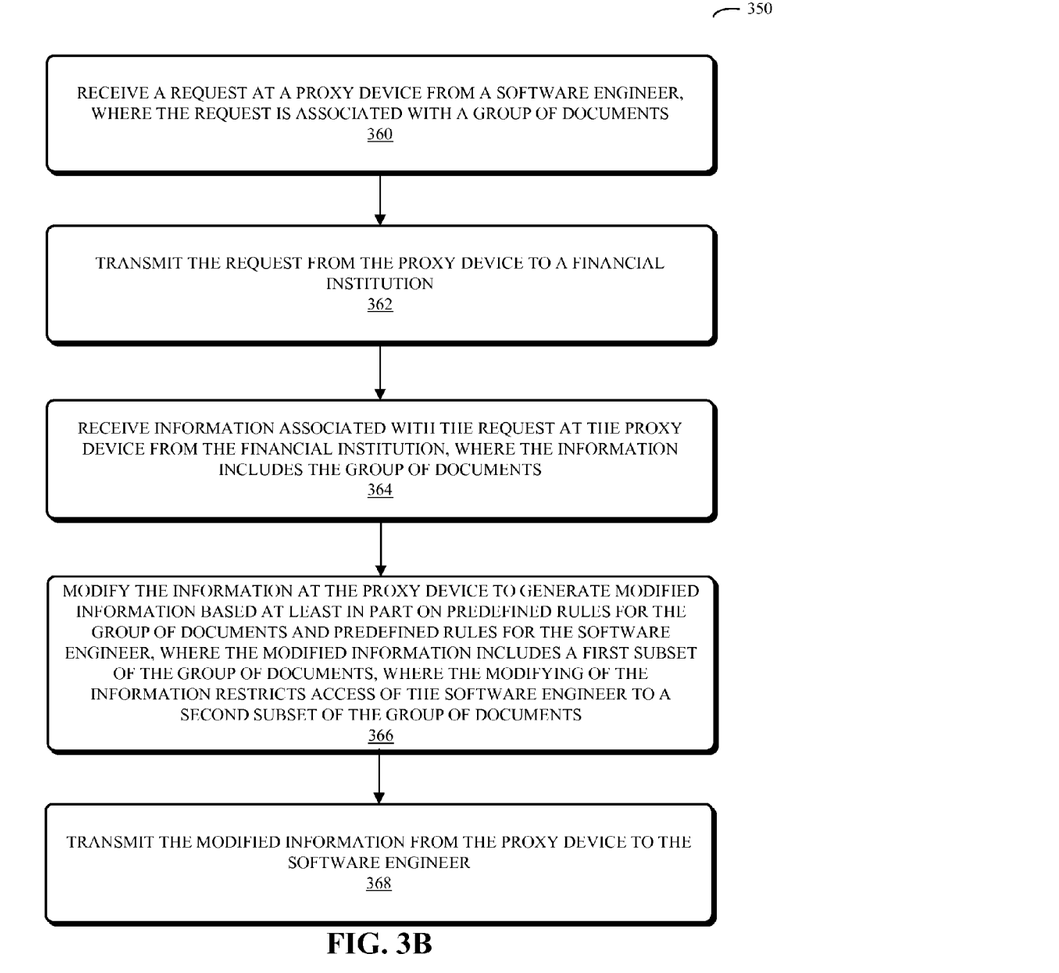
FIG. 3B is a flow chart illustrating a method for communicating information in accordance with an embodiment of the present disclosure.

FIG. 3B is a flow chart illustrating a method 350 for communicating information, which may be performed by a proxy device (such as proxy device 126 in FIG. 1). During operation, the proxy device receives a request from the software engineer (360) and transmits the request to the financial institution (362), where the request is associated with a group of documents. Then, the proxy device receives information associated with the request from the financial institution (364), where the information includes the group of documents.

Next, the proxy device modifies the information to generate modified information based at least in part on predefined rules for the group of documents and predefined rules for the software engineer (366), where the modified information includes a first subset of the group of documents, and where the modifying of the information restricts access of the software engineer to a second subset of the group of documents. Additionally, the proxy device transmits the modified information to the software engineer (368).

In variations on this method, the proxy device may block access and send an error message when a request for restricted information is received in operation 360. Alternatively or additionally, the proxy device may modify the request (as opposed to modifying the information provided by financial institution in operation 366).

Note that in some embodiments of methods 300 (FIG. 3A) and 350 there are additional or fewer operations. For example, the proxy device may log the information communicated to or from one or more financial institutions and/or one or more software engineers. This logged information may be used to monitor violations of the software-engineer profiles and/or the document rules. If a violation is detected, an administrator may be optionally alerted. Furthermore, the order of the operations in methods 300 (FIG. 3A) and 350 may be changed and/or two or more operations may be combined into a single operation.

In an exemplary embodiment, in order to resolve an issue, a software engineer may wish to log in to a website of a financial institution. Because of security constraints associated with this website (such as constraints included in document rules 216 in FIG. 2), the software engineer may not be permitted to view actual credential information. Using proxy device 126 (FIGS. 1 and 2), the software engineer logs into the website without seeing the credential information. In particular, the software engineer may configure a web browser to point to proxy device 126 (FIGS. 1 and 2), such that all communication with the financial institution passes thorough proxy device 126 (FIGS. 1 and 2). When accessing the website, the software engineer provides a username "dummy 12" and a password "dummy 14" on a log-in web page. Proxy device 126 (FIGS. 1 and 2) replaces these dummy values with the actual username "user 123" and password "password 123," which are stored on proxy device 126 (FIGS. 1 and 2). This allows the software engineer to log in directly to the website.

In another exemplary embodiment, the security constraints associated with this website do not permit the software engineer to view actual customer account data (such as an account number or account balance). In these embodiments, proxy device 126 (FIGS. 1 and 2) intercepts a response from the website and detects confidential information, such as customer account data, in a document. This confidential information may be masked or processed by the proxy device 126 (FIGS. 1 and 2) using a technique that obfuscates it before presenting the document to the software engineer. For example, an actual account number listed as "123456" on the website may be modified to "846876." In this way, the software engineer does not know the actual number. Similar modifications or substitutions may be used for account balances, such that an account balance of "$25.58" is presented to the software engineer as "$49.99."

In another exemplary embodiment, the security constraints associated with this website do not permit the software engineer to view every web page on the website. For example, the software engineer may be permitted to view a web page on the website that displays balances and transactions. However, the software engineer may not be permitted to view a web page that contains sensitive personal information, such as a customer address and phone number. This web page may be blocked by proxy device 126 (FIGS. 1 and 2).

Note that the financial software may include software such as: Quicken™ and/or TurboTax™ (from Intuit, Inc., of Mountain View, Calif.), Microsoft Money™ (from Microsoft Corporation, of Redmond, Wash.), SplashMoney™ (from SplashData, Inc., of Los Gatos, Calif.), Mvelopes™ (from In2M, Inc., of Draper, Utah), and/or open-source applications such as Gnucash™, PLCash™, Budget™ (from Snowmint Creative Solutions, LLC, of St. Paul, Minn.), and/or other planning software capable of processing financial information.

Moreover, the financial software may include software such as: QuickBooks™ (from Intuit, Inc., of Mountain View, Calif.), Peachtree™ (from The Sage Group PLC, of Newcastle Upon Tyne, the United Kingdom), Peachtree Complete™ (from The Sage Group PLC, of Newcastle Upon Tyne, the United Kingdom), MYOB Business Essentials™ (from MYOB US, Inc., of Rockaway, N.J.), NetSuite Small Business Accounting™ (from NetSuite, Inc., of San Mateo, Calif.), Cougar Mountain™ (from Cougar Mountain Software, of Boise, Id.), Microsoft Office Accounting™ (from Microsoft Corporation, of Redmond, Wash.), Simply Accounting™ (from The Sage Group PLC, of Newcastle Upon Tyne, the United Kingdom), CYMA IV Accounting™ (from CYMA Systems, Inc., of Tempe, Ariz.), DacEasy™ (from Sage Software SB, Inc., of Lawrenceville, Ga.), Microsoft Money™ (from Microsoft Corporation, of Redmond, Wash.), and/or other payroll or accounting software capable of processing payroll information.

Figure 4:
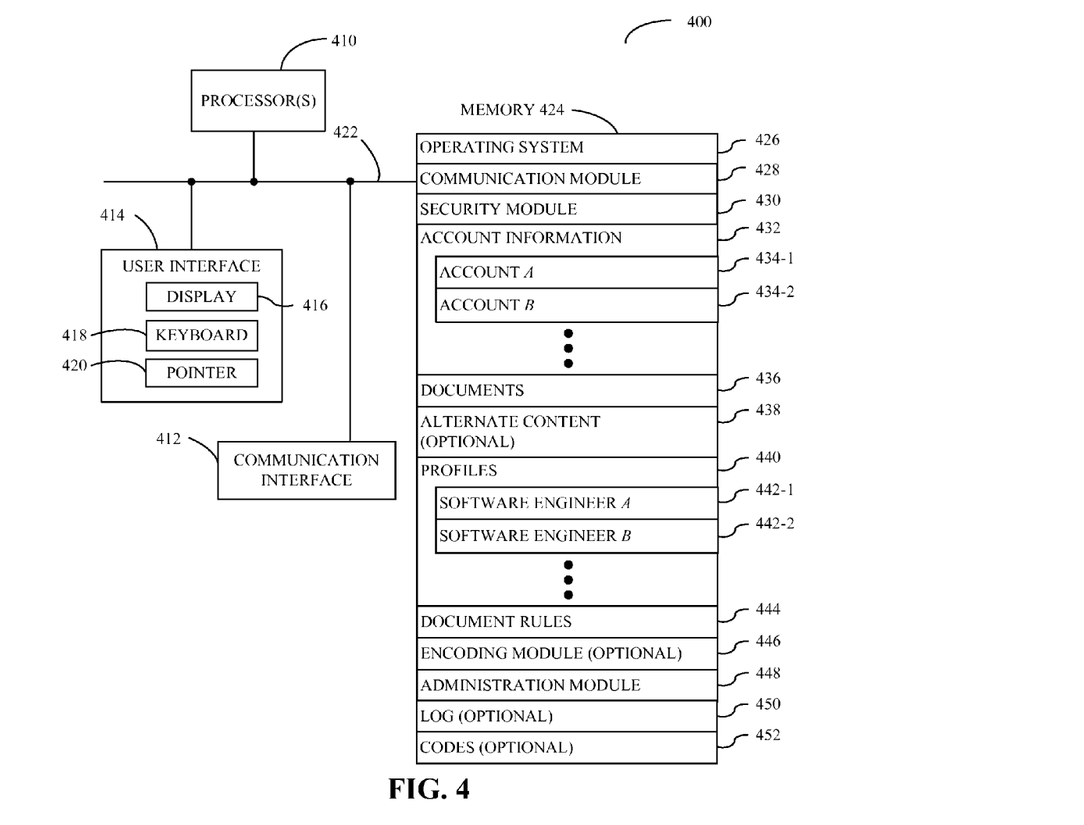
FIG. 4 is a block diagram illustrating a computer system in accordance with an embodiment of the present disclosure.

FIG. 4 presents a block diagram illustrating a computer system 400 that communicates information with one or more software engineers. Computer system 400 includes one or more processors 410, a communication interface 412, a user interface 414, and one or more signal lines 422 coupling these components together. Note that the one or more processing units 410 may support parallel processing and/or multi-threaded operation, the communication interface 412 may have a persistent communication connection, and the one or more signal lines 422 may constitute a communication bus. Moreover, the user interface 414 may include: a display 416, a keyboard 418, and/or a pointer 420, such as a mouse.

Memory 424 in the computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. While not shown in the computer system 400, in some embodiments memory 424 includes a browser. Memory 424 may also store procedures (or a set of instructions) in a communication module 428. These communication procedures may be used for communicating with one or more computers and/or servers, including computers and/or servers that are remotely located with respect to the computer system 400.

Memory 424 may also include multiple program modules (or sets of instructions), including: security module 430 (or a set of instructions), optional encoding module 446 (or a set of instructions), and/or administration module 448 (or a set of instructions). Using administration module 448, one or more software engineers and/or an administrator may establish profiles 440 (which include privileges for the software engineers), such as profiles for software engineer A 442-1 and/or software engineer B 442-2. In addition, an administrator may define document rules 444.

Subsequently, when a given software engineer attempts to access a website associated with a financial institution, security module 430 may modify or restrict content in one or more documents 436 that are associated with customer accounts (such as account A 434-1 or account B 434-2 in account information 432) based at least in part on predefined profiles 440 and/or document rules 444. For example, security module 430 may replace credential information (which is stored in account information 432) for use on a log-in web page with dummy credential information. More generally, security module 430 may replace content in one or more documents 436 with optional alternate content 438 prior to providing the one or more documents 436 to the given software engineer using communication module 428. Moreover, this substitution may be reversed prior to communicating information received from the given software engineer to the financial institution using communication module 428.

Alternatively or additionally, optional encoding module 446 may encode content in one or more documents 436 using optional codes 452 prior to providing the one or more documents 436 to the given software engineer using communication module 428. Moreover, information received from the given software engineer may be decrypted prior to communicating it to the financial institution using communication module 428.

In some embodiments, security module 430 restricts access by the given software engineer to one or more of documents 436 (such as one or more web pages) and/or to portions of one or more of documents 436. For example, software module 430 may filter or mask at least a portion of a given document based at least in part on predefined profiles 440 and/or document rules 444.

In some embodiments, security module 430 maintains an optional log 450 of documents that are received and transmitted, as well as any modifications made to these documents. In addition, optional log 450 may store any detected violations (or attempted violations) of predefined profiles 440 and/or document rules 444. Note that security module 430 may use communication module 428 to alert the administrator if a violation (or an attempted violation) is detected.

Instructions in the various modules in the memory 424 may be implemented in: a high-level procedural language, an object-oriented programming language, and/or in an assembly or machine language. Note that the programming language may be compiled or interpreted, e.g., configurable or configured, to be executed by the one or more processing units 410.

Although the computer system 400 is illustrated as having a number of discrete items, FIG. 4 is intended to be a functional description of the various features that may be present in the computer system 400 rather than a structural schematic of the embodiments described herein. In practice, and as recognized by those of ordinary skill in the art, the functions of the computer system 400 may be distributed over a large number of servers or computers, with various groups of the servers or computers performing particular subsets of the functions. In some embodiments, some or all of the functionality of the computer system 400 may be implemented in one or more application-specific integrated circuits (ASICs) and/or one or more digital signal processors (DSPs).

Computer system 400 may include one of a variety of devices capable of manipulating computer-readable data or communicating such data between two or more computing systems over a network, including: a personal computer, a laptop computer, a mainframe computer, a portable electronic device (such as a cellular phone or PDA), a proxy device, a server and/or a client computer (in a client-server architecture). This communication may be via a network, such as via networks 112-1 and 112-2 (FIG. 1), which may include: the Internet, World Wide Web (, an intranet, LAN, WAN, MAN, or a combination of networks, or other technology enabling communication between computing systems. Moreover, this network may include one or more communication channels (also referred to as channels) or links, which convey information between at least two locations (such as computer 110 in FIG. 1 and a server associated with one of the one or more financial institutions 116 in FIG. 1) using point-to-point or multi-point communication.

Furthermore, computer system 400 may include fewer components or additional components. Moreover, two or more components may be combined into a single component and/or a position of one or more components may be changed. In some embodiments, the functionality of computer system 400 may be implemented more in hardware and less in software, or less in hardware and more in software, as is known in the art.

Figure 5:
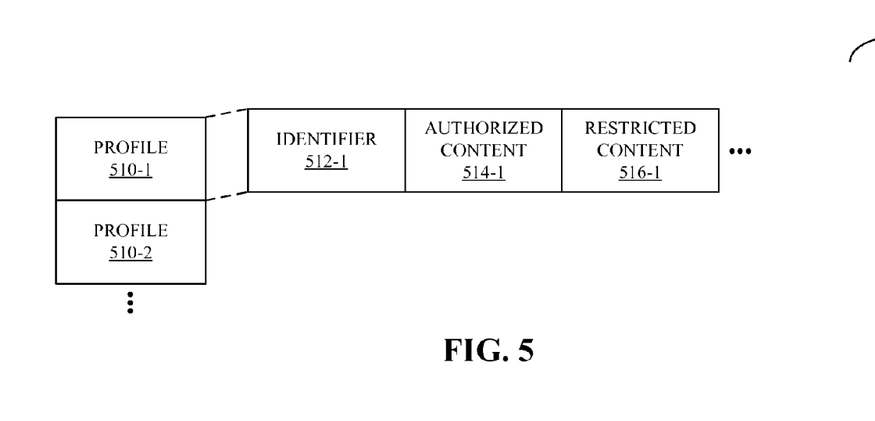
FIG. 5 is a block diagram illustrating a data structure in accordance with an embodiment of the present disclosure.

We now discuss data structures that may be used in system 100 (FIG. 1), proxy device 126 (FIGS. 1 and 2) and/or computer system 400. FIG. 5 presents a block diagram illustrating a data structure 500. This data structure may include information for one or more profiles 510, such as those associated with software engineers. A given profile, such as profile 510-1, may include: an identifier 512-1 of a software engineer, authorized content 514-1 that the software engineer is allowed to view or access, and/or restricted content 516-1 that the software engineer is not allowed to view or access.

Figure 6:
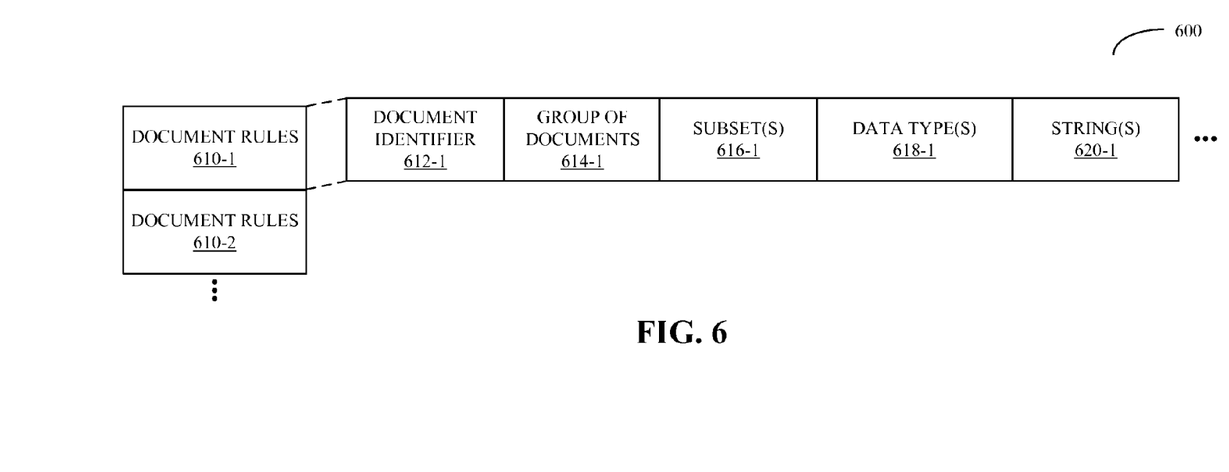
FIG. 6 is a block diagram illustrating a data structure in accordance with an embodiment of the present disclosure.

FIG. 6 is a block diagram illustrating an embodiment of a data structure 600. This data structure may include information for one or more document rules 610. A given document rule, such as document rule 610-1, may include: a document identifier 612-1 (such as a URL) and/or an associated group of documents 614-1 (such as a website). Moreover, document rules 610-1 may include masking rules, such as: one or more subsets 616-1 of the group of documents 614-1 that can be viewed by software engineers having a given access level, and/or data types 618-1 and strings 620-1 that are to be restricted (for example, blocked, encoded or replaced with dummy information).

Note that that in some embodiments of the data structures 500 (FIG. 5) and/or 600 there are fewer or additional components. Moreover, two or more components may be combined into a single component and/or a position of one or more components may be changed.

While the preceding embodiments have illustrated the application of the proxy device and the security technique with financial information from financial institutions, in other embodiments the proxy device and the security technique may be applied in a variety of environments and types of data that can be accessed. For example, the proxy device may be used to secure sensitive health-care information from third-party contractors that perform billing or record-keeping services. In this way, the proxy device and the security technique may help ensure compliance with regulations, such as the Health Insurance Portability and Accountability Act (HIPAA).

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:

1. A system to communicate account information, comprising:
   one or more processors; and
   a non-transitory computer readable medium comprising instructions which, when executed by at least one of the one or more processors, cause a first hardware-based interface to:
   receive a request comprising a dummy username and password from a software engineer at a client device to access a financial account at a financial institution, wherein the request is directed to a server at the financial institution; and
   transmit a second data stream to the software engineer at the client device; and
   a second hardware-based interface that:
   transmits a modified request to the server at the financial institution; and
   receives, in response to the transmitting, a first data stream from the financial institution, wherein the first data stream includes a first account information for the financial account; and
   a hardware-based proxy device comprising:
   a processor of the one or more processors,
   the hardware-based proxy device coupled to the first hardware-based interface and the second hardware-based interface,
   the processor executing instructions that cause the hardware-based proxy device to perform a method for communicating information between a financial institution and a software engineer, the method comprising:
   generating a modified request to access the financial account at the financial institution, the generating comprising replacing the dummy username and password in the received request from the software engineer with actual username and password for the financial account at the financial institution;
   identifying sensitive account information in the first account information, wherein the sensitive account information needs to be protected from viewing by the software engineer;
   in response to the identifying mapping each character of the sensitive account information to a corresponding character of a unique code comprising an encoded version of the sensitive account information which expires after a time interval;
   generating a second account information from the first account information by replacing the sensitive account information with the unique code;
   generating a second data stream, wherein the second data stream comprises the second account information;
   determining that the time interval has elapsed;
   expiring the unique code; and upon receiving, by the first hardware-based interface, a second request from the software engineer at the client device to access the financial account at the financial institution:
  mapping each character of the sensitive account information to a corresponding character of a second unique code comprising an encoded version of the sensitive account information which expires after a time interval;
  generating a third account information from the first account information by replacing the sensitive account information with the unique code; and
  generating a third data stream comprising the third account information.

2. The system of claim 1, wherein the software engineer is associated with an organization that is different than the financial institution.

3. The system of claim 1, wherein given account information, which can be the first account information or the second account information, includes an account number, financial values associated with a financial transaction or an account balance.

4. The system of claim 1, wherein the modifying of the first data stream is selectively enabled based at least in part on predefined profiles of software engineers.

5. The system of claim 1, wherein the first hardware-based interface is configured to receive the second account information in a third data stream from the software engineer;
  wherein the second hardware-based interface is configured to transmit the first account information in a fourth data stream to the financial institution; and
  wherein the proxy device is configured to modify the third stream by replacing the second account information with the first account information.

6. A method of communicating information between a financial institution and a software engineer using a proxy device that is an intermediary between the financial institution and the software engineer, the method comprising:
  intercepting, at the proxy device, a request comprising a dummy username and password to access a financial account at a financial institution, wherein the request is received from a software engineer at a client device, and wherein the request is directed to a server at the financial institution;
  generating, at the proxy device, a modified request to access the financial account at the financial institution, the generating comprising replacing the dummy username and password in the received request with actual username and password for the financial account at the financial institution;
  sending, by the proxy device, the generated modified request to the server at the financial institution;
  in response to the sending, receiving, at the proxy device, a first data stream from the financial institution, wherein the first data stream includes a first account information for the financial account;
  identifying, by the proxy device, sensitive account information in the first account information, wherein the sensitive account information needs to be protected from viewing by the software engineer;
  in response to the identifying, mapping each character of the sensitive account information to a corresponding character of a unique code comprising an encoded version of the sensitive account information which expires after a time interval;
  generating a second account information from the first account information by replacing the sensitive account information with the unique code;
  generating, by the proxy device, a second data stream, wherein the second data stream comprises the second account information;
  transmitting, by the proxy device, the second data stream to the software engineer at the client device, thereby facilitating financial software development while maintaining security of the financial account;
  receiving, by the proxy device, a second request from the software engineer at the client device to access the financial account at the financial institution:
  mapping, by the proxy device, each character of the sensitive account information to a corresponding character of a second unique code comprising an encoded version of the sensitive account information which expires after a time interval;
  generating, by the proxy device, a third account information from the first account information by replacing the sensitive account information with the unique code; and
  generating, by the proxy device, a third data stream comprising the third account information; and
  transmitting, by the proxy device, the third data stream to the software engineer at the client device.

7. The method of claim 6, wherein the software engineer is associated with an organization that is different than the financial institution.

8. The method of claim 6, wherein given account information, which can be the first account information or the second account information, includes an account number, financial values associated with a financial transaction or an account balance.

9. The method of claim 6, further comprising:
  receiving the second account information at the proxy device in a third data stream from the software engineer;
  modifying the third data stream at the proxy device by replacing the second account information with the first account information; and
  transmitting the first account information in a fourth data stream from the proxy device to the financial institution.

10. A non-transitory storage medium storing instructions that, when executed by a processor of a proxy device, cause the processor to perform a method for communicating information between a financial institution and a software engineer, the method comprising:
  intercepting, at the proxy device, a request comprising a dummy username and password to access a financial account at a financial institution, wherein the request is received from a software engineer at a client device, and wherein the request is directed to a server at the financial institution;
  generating, at the proxy device, a modified request to access the financial account at the financial institution, the generating comprising replacing the dummy username and password in the received request with actual username and password for the financial account at the financial institution;
  sending, by the proxy device, the generated modified request to the server at the financial institution;
  in response to the sending, receiving, at the proxy device, a first data stream from the financial institution, wherein the first data stream includes a first account information for the financial account;

identifying, by the proxy device, sensitive account information in the first account information, wherein the sensitive account information needs to be protected from viewing by the software engineer;
in response to the identifying, mapping each character of the sensitive account information to a corresponding character of a unique code comprising an encoded version of the sensitive account information which expires after a time interval;
generating a second account information from the first account information by replacing the sensitive account information with the unique code;
generating, by the proxy device, a second data stream, wherein the second data stream comprises the second account information;
transmitting, by the proxy device, the second data stream to the software engineer at the client device, thereby facilitating financial software development while maintaining security of the financial account;
receiving, by the proxy device, a second request from the software engineer at the client device to access the financial account at the financial institution:
mapping, by the proxy device, each character of the sensitive account information to a corresponding character of a second unique code comprising an encoded version of the sensitive account information which expires after a time interval;
generating, by the proxy device, a third account information from the first account information by replacing the sensitive account information with the unique code; and
generating, by the proxy device, a third data stream comprising the third account information; and
transmitting, by the proxy device, the third data stream to the software engineer at the client device.

11. The non-transitory storage medium of claim 10, wherein the software engineer is associated with an organization that is different than the financial institution.

12. The non-transitory storage medium of claim 10, wherein given account information, which can be the first account information or the second account information, includes an account number, financial values associated with a financial transaction or an account balance.

13. The non-transitory storage medium of claim 10, further comprising:
instructions for receiving the second account information at the proxy device in a third data stream from the software engineer;
instructions for modifying the third data stream at the proxy device by replacing the second account information with the first account information; and
instructions for transmitting the first account information in a fourth data stream from the proxy device to the financial institution.

14. A proxy device, comprising:
a processor;
memory;
a program module stored in the memory and configured to be executed by the processor, the program module including instructions that when executed by the processor cause the proxy device to perform a method for communicating information between a financial institution and a software engineer using the proxy device, which is an intermediary between the financial institution and the software engineer, the method comprising:
intercepting, at the proxy device, a request comprising a dummy username and password to access a financial account at a financial institution, wherein the request is received from a software engineer at a client device, and wherein the request is directed to a server at the financial institution;
generating, at the proxy device, a modified request to access the financial account at the financial institution, the generating comprising replacing the dummy username and password in the received request with actual username and password for the financial account at the financial institution;
sending, by the proxy device, the generated modified request to the server at the financial institution;
in response to the sending, receiving, at the proxy device, a first data stream from the financial institution, wherein the first data stream includes a first account information for the financial account;
identifying, by the proxy device, sensitive account information in the first account information, wherein the sensitive account information needs to be protected from viewing by the software engineer;
in response to the identifying, mapping each character of the sensitive account information to a corresponding character of a unique code comprising an encoded version of the sensitive account information which expires after a time interval;
generating a second account information from the first account information by replacing the sensitive account information with the unique code;
generating, by the proxy device, a second data stream, wherein the second data stream comprises the second account information;
transmitting, by the proxy device, the second data stream to the software engineer at the client device, thereby facilitating financial software development while maintaining security of the financial account;
receiving, by the proxy device, a second request from the software engineer at the client device to access the financial account at the financial institution:
mapping, by the proxy device, each character of the sensitive account information to a corresponding character of a second unique code comprising an encoded version of the sensitive account information which expires after a time interval;
generating, by the proxy device, a third account information from the first account information by replacing the sensitive account information with the unique code; and
generating, by the proxy device, a third data stream comprising the third account information; and
transmitting, by the proxy device, the third data stream to the software engineer at the client device.

\* \* \* \* \*